T. HANCOCK & J. H. LEAMAN.

GRAIN-SEPARATOR.

No. 7,168. Reissued June 13, 1876.

Witnesses.
Lind G. Dietrich
W. V. Halp.

Inventors:
Thos. Hancock.
John H. Leaman.
by Dewitt C. Allen
Atty

N. PETERS, PHOTO-LITHOGRAPHER, WASHINGTON, D. C.

UNITED STATES PATENT OFFICE.

THOMAS HANCOCK AND JOHN H. LEAMAN, OF RICHMOND, VA., ASSIGNORS, BY MESNE ASSIGNMENTS, TO E. P. ALLIS, OF MILWAUKEE, WIS.

IMPROVEMENT IN GRAIN-SEPARATORS.

Specification forming part of Letters Patent No. 73,803, dated January 28, 1868; reissue No. 7,168, dated June 13, 1876; application filed June 3, 1876.

*To all whom it may concern:*

Be it known that we, THOMAS HANCOCK and JOHN H. LEAMAN, of Richmond, in the county of Henrico and State of Virginia, have invented certain new and useful Improvements in Machines for Separating Cockle and other Seed from Wheat; and we do hereby declare that the following is a full, clear, and exact description of the same, reference being had to the accompanying drawing, forming a part of this specification, in which—

Figure 1:
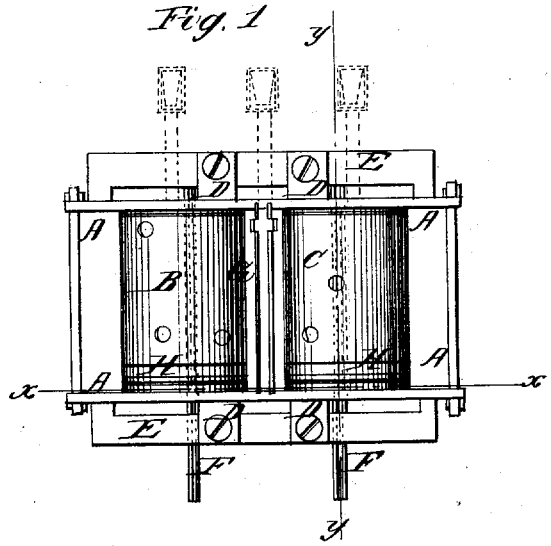
Figure 2:
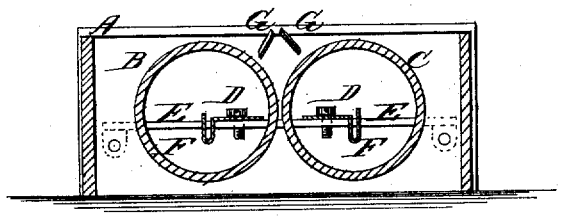
Figure 3:
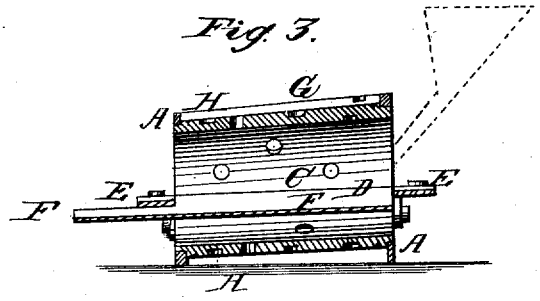

Figure 1 is a top view of our improved machine. Fig. 2 is a vertical section of the same, taken through the line *x x* of Fig. 1. Fig. 3 is a vertical section of the same, taken through the line *y y* of Fig. 1.

Similar letters of reference indicate like parts.

Our invention has for its object to furnish an improved machine, by means of which cockle-seed, onion-seed, partridge-peas, &c., may be separated from the wheat conveniently; and it consists of a cylinder or cylinders, formed from a single thickness of metal, and provided with small holes, cavities, or indentations on its or their interior surface or surfaces for taking up the cockle and other small seed as the cylinder or cylinders revolve. It also consists in combining, with said cylinder or cylinders, formed from a single thickness of metal, and a bar or plate and spout arranged therein for preventing any wheat being carried up as the cylinder or cylinders revolve, and catching and conducting out of the cylinder the cockle and other small seed. It further consists in providing one or more cylinders with holes, cavities, or indentations upon both the interior and exterior surfaces. It still further consists in combining, with cylinders having holes, cavities, or indentations on their exterior surfaces, of guard-plates or a bar, for preventing passage of wheat as the cylinders revolve. It finally consists in forming shallow grooves around the lower end of the cylinders, all as hereinafter fully described.

A is the frame, in bearings in which the cylinders B and C revolve. B and C are hollow cylinders, formed from a single thickness of metal, and which are pivoted to the frame A in such an inclined position that the wheat will move freely through their interior, or through the space above and between the said cylinders, being fed by separate hoppers, one for each cylinder, and one for the space above the cylinders, as clearly shown in the drawing. The rollers B and C are made to revolve in opposite directions by any ordinary gearing, driven by any desired power. Upon the inner or outer surface of the cylinders, or upon both the inner and outer surfaces, are formed small holes, cavities, or indentations, as seen in Figs. 1 and 2. D are bars or plates attached to bars or supports E, secured to the frame A, and having spouts F, formed upon, or attached to, their edges, which are toward the axes of the cylinders. G are guard-plates, the ends of which are placed in grooves formed in the frame A in such a direction that the planes of the plates G may be nearly at right angles to the tangents of the cylinders at the points where the planes of the plates would intersect the cylinders. H are shallow grooves or spaces formed around the lower ends of the cylinders, as shown in Figs. 1 and 3.

As the wheat is passing through the cylinders the fine seeds that are to be separated from the wheat enter the holes, cavities, or indentations in their interior surfaces, and are carried up by the revolutions of said cylinders, the fine seeds falling upon the upper surface of said bars D, and passing out of the machine through the spouts F, the bars D pushing back any kernels of wheat that may be carried up by said holes, cavities, or indentations, and which is discharged out of the lower ends of the cylinders. As the wheat passes through the space above and between the rollers B and C, the small seeds are carried up by the holes, cavities, or indentations in the outer surface of said cylinders, and are discharged from the machine; or they may escape through the grooves H, the guard-plate G preventing the passage of the kernels of wheat.

What we claim as our invention is—

1. A revolving cylinder or cylinders, formed from a single thickness of metal, and having holes, cavities, or indentations, formed upon their interior surfaces, substantially as and for purpose specified.

2. The combination, with a revolving cylinder or cylinders, formed from a single thickness of metal, and having holes, cavities, or indentations upon their interior surfaces, of a stationary bar or plate and spout, arranged therein substantially as and for the purpose specified.

3. One or more cylinders for separating cockle and other foreign substances from wheat or other grain, having holes, cavities, or indentations formed both upon the interior and exterior surfaces thereof, substantially as and for the purpose specified.

4. The combination of the guard-plates or bar G with the exterior of the cylinders B and C, substantially as and for the purpose specified.

5. The separating-cylinders B and C, having shallow grooves H formed around their lower ends, substantially as and for the purpose specified.

THOMAS HANCOCK.
JOHN H. LEAMAN.

Witnesses:
A. AUSTIN SMITH,
JNO. S. WISE.